US010472067B2

(12) United States Patent
Breuer et al.

(10) Patent No.: US 10,472,067 B2
(45) Date of Patent: Nov. 12, 2019

(54) SEPARATING DEVICE FOR SEPARATING TWO ZONES OF A PASSENGER CABIN EQUIPPED WITH OVERHEAD LUGGAGE BINS COMPRISING A MOVABLE SHELL

(71) Applicant: Airbus Operations GmbH, Hamburg (DE)

(72) Inventors: Matthias Breuer, Hamburg (DE); Sabrina Moje, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 464 days.

(21) Appl. No.: 14/828,671

(22) Filed: Aug. 18, 2015

(65) Prior Publication Data

US 2016/0059964 A1    Mar. 3, 2016

(30) Foreign Application Priority Data

Aug. 27, 2014   (EP) ..................................... 14182416

(51) Int. Cl.
  *B64D 11/00*    (2006.01)
(52) U.S. Cl.
  CPC ........ *B64D 11/0023* (2013.01); *B64D 11/003* (2013.01)
(58) Field of Classification Search
  CPC ... B64D 11/00; B64D 11/0023; B64D 11/003; B64D 11/032; B64D 11/0606
  See application file for complete search history.

(56) References Cited

U.S. PATENT DOCUMENTS 5,165,626 A * 11/1992 Ringger ............. B64D 11/0023
                                                             16/282
5,816,534 A * 10/1998 Schumacher ...... B64D 11/0023
                                                             244/119
(Continued)

FOREIGN PATENT DOCUMENTS

DE    102008016419    10/2009
DE    102008031021     1/2010
(Continued)

OTHER PUBLICATIONS

European Search Report, dated Mar. 4, 2015.

*Primary Examiner* — Medhat Badawi
*Assistant Examiner* — Christopher D Hutchens
(74) *Attorney, Agent, or Firm* — Greer, Burns & Crain, Ltd.

(57) ABSTRACT

A separating device for separating two zones of a passenger cabin equipped with overhead luggage bins comprising a movable shell comprising a curtain element made of a flexible material and being dimensioned and shaped so as to be capable of at least partially covering an area extending below an overhead luggage bin with its movable shell being in its closed position in a direction substantially perpendicular to a longitudinal axis of the overhead luggage bin. The curtain element has a first edge adapted to face the movable shell of the overhead luggage bin when the separating device is mounted in the passenger cabin. The separating device further comprises a holder supporting a first end of the first edge of the curtain element and a fixing device adapted to fix a second end of the first edge of the curtain element to the movable shell of the overhead luggage bin.

17 Claims, 4 Drawing Sheets

(56) References Cited

U.S. PATENT DOCUMENTS

| | | | |
|---|---|---|---|
| 2007/0018044 A1* | 1/2007 | Bock | B64D 11/0023 244/118.5 |
| 2009/0224103 A1* | 9/2009 | Neumann | B64D 11/0023 244/131 |
| 2009/0242149 A1 | 10/2009 | Breuer et al. | |
| 2011/0062283 A1* | 3/2011 | Breuer | B64D 11/00 244/118.5 |
| 2011/0114788 A1 | 5/2011 | Mosler et al. | |
| 2011/0180664 A1* | 7/2011 | Bartels | B64D 11/0015 244/118.5 |
| 2012/0112505 A1 | 5/2012 | Breuer et al. | |
| 2013/0248651 A1* | 9/2013 | Burrows | B64D 11/0023 244/118.5 |
| 2014/0124623 A1* | 5/2014 | Chandler | B64D 11/0023 244/118.5 |
| 2014/0158310 A1 | 6/2014 | Slyter et al. | |
| 2016/0297525 A1* | 10/2016 | Walton | B64D 11/0023 |

FOREIGN PATENT DOCUMENTS

| | | |
|---|---|---|
| WO | 2010000700 | 1/2010 |
| WO | 2013142660 | 9/2013 |

\* cited by examiner

SEPARATING DEVICE FOR SEPARATING TWO ZONES OF A PASSENGER CABIN EQUIPPED WITH OVERHEAD LUGGAGE BINS COMPRISING A MOVABLE SHELL

CROSS-REFERENCES TO RELATED APPLICATIONS

This application claims the benefit of the European patent application No. 14182416.9 filed on Aug. 27, 2014, the entire disclosures of which are incorporated herein by way of reference.

BACKGROUND OF THE INVENTION

The invention relates to a separating device for separating two zones of a passenger cabin, in particular an aircraft passenger cabin, which is equipped with overhead luggage bins comprising a movable shell. Further, the invention relates to a passenger cabin interior component layout, in particular an aircraft passenger cabin interior component layout, which comprises a separating device of this kind. The invention further relates to a method of separating two zones of a passenger cabin, in particular an aircraft passenger cabin, using a separating device of this kind.

The passenger cabin of a modern commercial aircraft usually is subdivided into various zones, for example, a business class zone located in a front region of the passenger cabin and a tourist class zone located in a rear region of said passenger cabin. For separating the business class zone from the tourist class zone, fixed partitions as described, for example, in DE 10 2008 031021 A1 or WO 2010/000700 A2 and in DE 10 2008 016 419 A1 or US 2009/242149 A1 may be installed in the passenger cabin.

In order to be able to cope with different conditions of use, it is becoming increasingly more important to organize the subdivision of an aircraft passenger cabin into different zones in the most flexible manner possible. For example, it may be economically sensible, from an airline's point of view, to use the largest possible area within the passenger cabin of a commercial aircraft as a tourist class zone at certain times when there is a higher volume of flights, e.g., during the holiday season. On the other hand it may be sensible at other times, for example, when there are lots of bookings by business travelers, to identify a larger area of the aircraft passenger cabin as a business class zone. Therefore, movable class dividers in the form of curtains which are mounted at a desired location in the passenger cabin become increasingly popular. These curtains usually are fixed in the region of a PSU (Personal Service Unit) panel extending below fixed luggage bins mounted in an overhead region above the rows of passenger seats installed in the aircraft cabin.

SUMMARY OF THE INVENTION

The present invention is directed to an object of providing a separating device for tightly separating two zones of a passenger cabin, in particular an aircraft passenger cabin, which is equipped with overhead luggage bins, comprising a fixed housing and a shell which is movable relative to the housing between a closed position and an open loading position. Another object underlying the invention is to provide a passenger cabin interior component layout, in particular an aircraft passenger cabin interior component layout, which comprises a separating device of this kind. Finally, the invention is directed towards an object of indicating a method of separating two zones of a passenger cabin, in particular an aircraft passenger cabin, using a separating device of this kind.

A separating device for separating two zones of a passenger cabin equipped with overhead luggage bins being equipped with a movable shell comprises a curtain element which is made of a flexible material. For example, the curtain element may be made of a fabric material, in particular a woven or knitted fabric material. If desired, the material for making the curtain element may be selected in such a manner that the curtain element has some stretch properties. For example, the material for making the curtain element may contain a polyester/elastane mixture. In the event of a fire, the material must not form drops, and any toxic components must immediately break down into non-toxic components.

The curtain element is dimensioned and shaped so as to be capable of at least partially covering an area extending below an overhead luggage bin with its movable shell being in its closed position in a direction substantially perpendicular to a longitudinal axis of the overhead luggage bin, wherein the curtain element has a first edge adapted to face the movable shell of the overhead luggage bin when the separating device is mounted in the passenger cabin. Thus, when the separating device is mounted in the passenger cabin, the curtain element extends in a plane extending substantially perpendicular to the longitudinal axis of the overhead luggage bin and hence also substantially perpendicular to a longitudinal axis of the passenger cabin so as to separate the passenger cabin, along the longitudinal axis of the passenger cabin, into two zones.

The separating device further comprises a holder supporting a first end of the first edge of the curtain element. When the separating device is mounted in the passenger cabin, the first end of the first edge of the curtain element preferably faces a side wall of the passenger cabin, i.e., faces away from an aisle extending through the passenger cabin between rows of passenger seats mounted in the passenger cabin. In particular, the holder is adapted to support the first end of the first edge of the curtain element in such a manner that the curtain element extends in the direction of the side wall of the passenger cabin as far as possible, when the separating device is mounted in the passenger cabin. This provides for a tight separation of the two zones of the passenger cabin also in the region of the side wall of the passenger cabin.

Finally, the separating device comprises a fixing device which is adapted to fix a second end of the first edge of the curtain element to the movable shell of the overhead luggage bin. Hence, the first edge of the curtain element, at its first end, is connected to the holder and, at its second end, is connected to the movable shell of the overhead luggage bin. The second end of the first edge of the curtain element thus is movable together with the movable shell of the overhead luggage bin when the movable shell is moved between its closed position and its open loading position. When the movable shell of the overhead luggage bin is in its open loading position, the first edge of the curtain element is freely suspended between the holder and the fixing device, wherein, due to the flexibility of the material of the curtain element, a gap may be formed between the movable shell of the overhead luggage bin and the curtain element. However, when the movable shell of the overhead luggage bin is in its closed position, the first edge of the curtain element follows the contour of the movable shell such that the curtain element provides for a tight separation of the two zones of the passenger cabin.

The separating device thus can be used in a passenger cabin equipped with overhead luggage bins comprising a movable shell for providing a tight separation between two zones of the passenger cabin. Furthermore, the separating device is easy to install and easy to reposition in the passenger cabin. Reconfiguration of the passenger cabin with the aid of the separating device thus is possible in a particularly simple manner.

The fixing device of the separating device may comprise a first fixing element which is adapted to engage with a rim of the movable shell of the overhead luggage bin. In particular, the first fixing element is adapted to engage with a rim of the movable shell of the overhead luggage bin which extends parallel to the longitudinal axis of the overhead luggage bin and thus also parallel to the longitudinal axis of the passenger cabin. For example, the first fixing element may comprise a hook which may be engaged with the rim of the movable shell of the overhead luggage bin when the movable shell is in its open loading position. The first fixing element may be attached to the movable shell of the overhead luggage bin in a "loose," i.e., an easily detachable manner, for example, by simply hooking a hook of the first fixing element over the rim of the movable shell. Alternatively, it is, however, also conceivable to provide the fixing device with a first fixing element which is suitable to form a still releasable, but "more fixed" connection with the movable shell of the overhead luggage bin. The first fixing element then, for example, may comprise a clamp or the like which provides for a secure fixation of the first fixing element to the movable shell of the overhead luggage bin.

The fixing device may further comprise a second fixing element which is adapted to engage with a grip rail provided on the movable shell of the overhead luggage bin. A second fixing element provides for a particularly save and reliable attachment of the fixing device to the movable shell of the overhead luggage bin. Like the first fixing element, also the second fixing element may be adapted to provide for a somewhat "loose" fixation of the fixing device to the grip rail provided on the movable shell. The second fixing element then, for example, may be provided with a hook which is hooked into the grip rail. Alternatively, it is, however, also conceivable to provide the fixing element with a second fixing element which allows the formation of a still releasable, but "more fixed" connection between the grip rail and the fixing device. In this case, the second fixing element, for example, may comprise a clamp or the like.

In a preferred embodiment of the separating device, the holder comprises a connection mechanism for connecting the holder to a PSU panel typically extending in the overhead region of the passenger cabin above the passenger seats and below the overhead luggage bins in such a manner that the holder extends in a direction substantially perpendicular to the longitudinal axis of the overhead luggage bin when the separating device is mounted in the passenger cabin. The connection mechanism may, for example, comprise a rail which is adapted to interact with a complementary rail provided in the region of a surface of the PSU panel. Further the connection mechanism may comprise a latching device for latching the holder in place when the holder is arranged in a desired position relative to the PSU panel.

The curtain element of the separating device, in the region of its first edge facing the overhead luggage bin, may be provided with an elastic strap or an elastic rope which is adapted to be tensioned when the movable shell of the overhead luggage bin is moved from its open loading position into its closed position. The first edge of the curtain element which faces the overhead luggage bin then closely follows the contour of the movable shell of the overhead luggage bin when the movable shell is in its closed position and thus provides for a particularly tight separation between the two zones of the passenger cabin.

In a preferred embodiment of the separating device, the holder comprises a tensioning device which is adapted to apply a tension force to the elastic strap provided in the region of the first edge of the curtain element which faces the overhead luggage bin when the separating device is mounted in the passenger cabin. The tensioning device may, for example, comprise a spring which is connected to the first end of the first edge of the curtain element. When the holder of the separating device is provided with a tensioning device, a certain tension force may be applied to the elastic strap also when the movable shell of the overhead luggage bin is in its open loading position. It is then not necessary for the fixing device to establish a "more fixed" connection between the second end of the first edge of the curtain element and the movable shell, for example, by means of a first and/or a second fixing element comprising a clamp or the like. Instead, also a fixing device which is adapted to merely establish a "loose" and hence easy releasable connection between the second end of the first edge of the curtain element and the movable shell, for example, by means of a first and/or a second fixing element comprising a simple hook, is sufficient to establish a reliable connection between the second end of the first edge of the curtain element and the movable shell. The separating device then is particularly easy to install and hence also particularly easy to relocate within the passenger cabin.

The holder of the separating device may also comprise an activation mechanism which is adapted to activate the tensioning device so as to apply a tension force to the elastic strap. Alternatively or additionally thereto, the activation mechanism may be adapted to activate the connection mechanism for connecting the holder to the PSU panel. In a particularly preferred embodiment of the separating device, the activation mechanism fulfils the double-function to active the tensioning device and to also active the connection mechanism, e.g., by activating a latching device of the connection mechanism for latching the holder in place when the holder is arranged in a desired position relative to the PSU panel. For example, the activation mechanism may comprise a lever arm which is movable between a rest position and an activation position. When the lever arm is in its activation position, the tensioning device may be activated so as to apply a tension force to the elastic strap. Additionally or alternatively thereto, the lever arm in its activating position may provide for an activation of the connection mechanism for connecting the holder to the PSU panel.

The holder of the separating device may have a frame-like structure. In particular, the holder may comprise a first frame element and a second frame element extending substantially parallel to the first frame element. A third frame element may connect the first and the second frame element. When the separating device is mounted in the passenger cabin, the first frame element may be adapted to be connected to the PSU panel by means of the connection mechanism so as to extend in a direction substantially perpendicular to the longitudinal axis of the overhead luggage bin and thus also substantially perpendicular to the longitudinal axis of the passenger cabin. The second frame element may extend parallel to the first frame element in the region of headrests of passenger seats mounted in the passenger cabin below the overhead luggage bins. Finally, the third frame element may extend parallel to a side wall of the passenger cabin and may have a contour which is adapted to the contour of the side wall of the passenger cabin.

Alternatively thereto, the holder may comprise a panel element and a further curtain element attached to the panel element in a freely suspended manner. When the separating device is mounted in the passenger cabin, the panel element may be adapted to be connected to the PSU panel by means of the connection mechanism so as to extend in a direction substantially perpendicular to the longitudinal axis of the overhead luggage bin and hence also substantially perpendicular to the longitudinal axis of the passenger cabin. The further curtain element may be adapted to cover a gap existing between an edge of the panel element which faces away from the overhead luggage bin and the headrests of passenger seats, when the separating device is mounted in the passenger cabin. The curtain element may be dimensioned and shaped so as to cover a gap existing between an edge of the panel element which faces the overhead luggage bin and the movable shell of the overhead luggage bin when the movable shell is in its closed position.

A passenger cabin interior component layout comprises an overhead luggage bin comprising a movable shell. The movable shell preferably is movable, relative to a housing of the overhead luggage bin, between a closed position and an open loading position. The passenger cabin interior component layout further comprises an above described separating device for separating two zones of the passenger cabin. In particular, the separating device comprises a curtain element which is made of a flexible material and which is dimensioned and shaped so as to at least partially cover an area extending below the overhead luggage bin with its movable shell being in its closed position in a direction substantially perpendicular to a longitudinal axis of the overhead luggage bin, the curtain element having a first edge facing the movable shell of the overhead luggage bin. The separating device further comprises a holder supporting a first end of the first edge of the curtain element and a fixing device fixing a second end of the first edge of the curtain element to the movable shell of the overhead luggage bin.

The fixing device of the separating device may comprise at least one of a first fixing element which engages with a rim of the movable shell of the overhead luggage bin and a second fixing element which engages with a grip rail provided on the movable shell of the overhead luggage bin.

Further, the holder of the separating device may comprise a connection mechanism for connecting the holder to a PSU panel so as to extend in a direction substantially perpendicular to the longitudinal axis of the overhead luggage bin.

The curtain element of the separating device, in the region of its first edge facing the overhead luggage bin, may be provided with an elastic strap which is adapted to be tensioned when the movable shell of the overhead luggage bin is moved from its open loading position into its closed position.

The holder of the separating device may further comprise a tensioning device which is adapted to supply a tension force to the elastic strap. Further, the holder may comprise an activation mechanism which is adapted to activate the tensioning device so as to apply a tension force to the elastic strap and/or to activate the connection mechanism for connecting the holder to the PSU panel. The activation mechanism may comprise a lever arm which is movable between a rest position and an activation position.

The holder of the separating device may have a frame-like structure with a first frame element, a second frame element extending substantially parallel to the first frame element and a third frame element connecting the first and the second frame element. The first frame element may be connected to the PSU panel by means of the connection mechanism so as to extend in a direction substantially perpendicular to the longitudinal axis of the overhead luggage bin.

Alternatively thereto, the holder may comprise a panel element and a further curtain element attached to the panel element in a freely suspended manner. The panel element may be connected to the PSU panel by means of the connection mechanism so as to extend in a direction substantially perpendicular to the longitudinal axis of the overhead luggage bin.

A method of separating two zones of a passenger cabin equipped with overhead luggage bins comprising a movable shell comprises the step of providing a separating device as described above. The holder of the separating device is mounted at a desired location in the passenger cabin. The second end of the first edge of the curtain element is fixed to the movable shell of the overhead luggage bin, preferably while the movable shell is in its open loading position. Finally, the movable shell may be moved into its closed position.

The separating device and the passenger cabin interior component layout are particularly suitable for installation in an aircraft passenger cabin. Further, the method of separating two zones of a passenger cabin is particularly suitable for separating two zones of an aircraft passenger cabin.

BRIEF DESCRIPTION OF THE DRAWINGS

Preferred embodiments of the invention are now described in greater detail with reference to the appended schematic drawings, wherein.

DETAILED DESCRIPTION OF THE PREFERRED EMBODIMENTS

Figure 1:
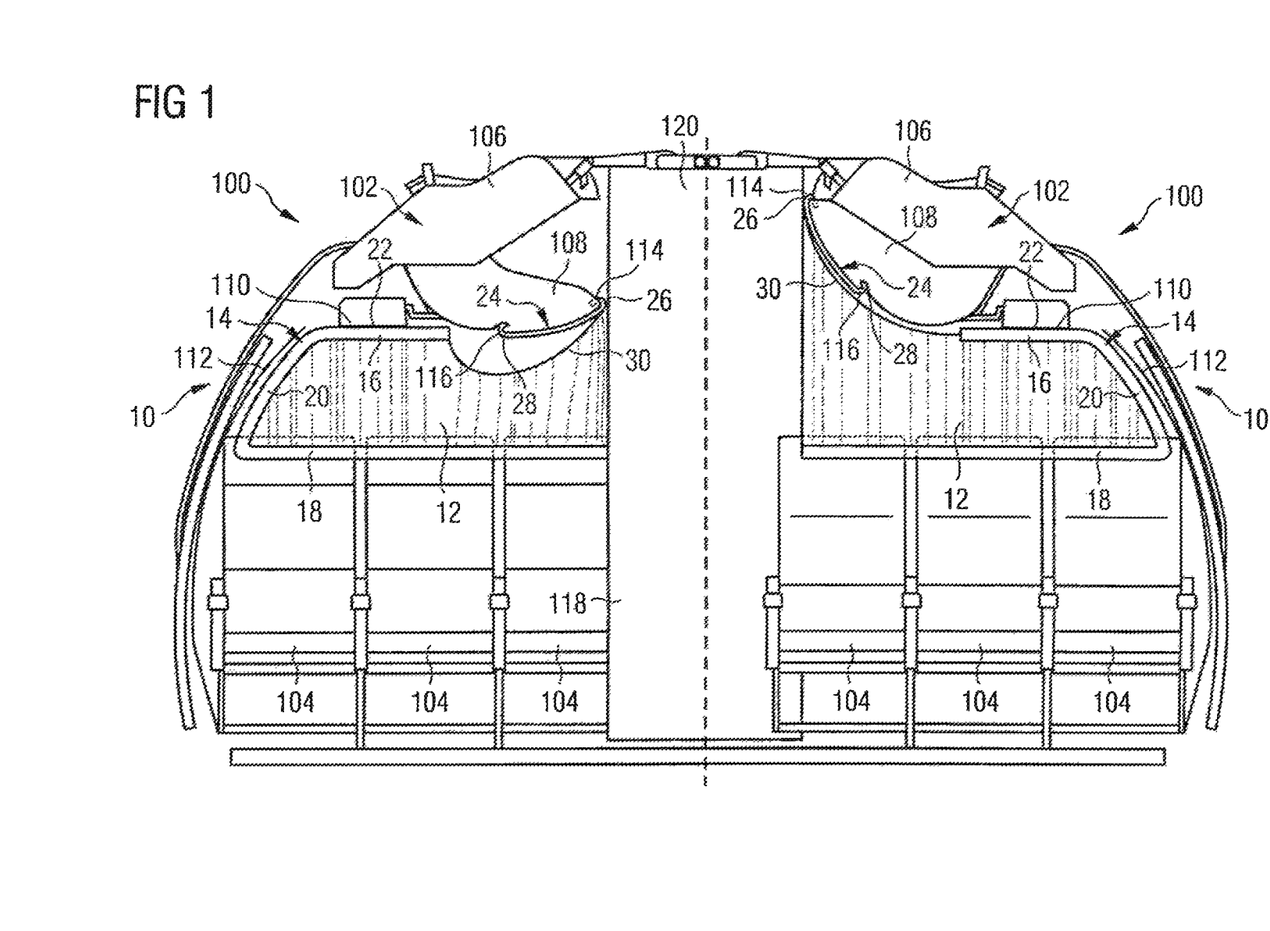
FIG. 1 shows a first embodiment of a passenger cabin interior component layout comprising a separating device for separating two zones of the passenger cabin.

FIG. 1 shows a passenger cabin interior component layout 100 for an aircraft cabin which comprises an overhead luggage bin 102 mounted in an overhead region of the cabin above a row of passenger seats 104. The overhead luggage bin 102 comprises a housing 106 which is attached to a primary structure of the aircraft (not shown in the drawings). Further, the overhead luggage bin 102 comprises a movable shell 108 which is movable relative to the housing 106 between closed position, see the layout 100 depicted on the right hand side of FIG. 1, and an open loading position, see the layout 100 depicted on the left hand side of FIG. 1.

The passenger cabin interior component layout 100 further comprises a separating device 10 which serves to separate two zones of the passenger cabin along a longitudinal axis of the passenger cabin. For example, the separating device 10 may be used in an aircraft passenger cabin to separate a business claims zone located in a front region of the passenger cabin from a tourist class zone located in a rear region of the passenger cabin.

The separating device 10 comprises a curtain element 12 which is made of a flexible material. In particular, the curtain element 12 of the separating device may be made of a fabric material. As becomes apparent from the arrangement depicted in the right hand side of FIG. 1, the curtain element 12 is dimensioned and shaped in such a manner that it substantially covers an area which extends below the overhead luggage bin 102 with its movable shell 108 being in its closed position in a direction substantially perpendicular to a longitudinal axis of the overhead luggage bin 102, i.e., in a direction substantially perpendicular to the longitudinal axis of the passenger cabin. In particular, the curtain element 12 is dimensioned and shaped in such a manner that it covers an area extending between the movable shell 108 of the overhead luggage bin 102 and headrests of the passenger seats 104. The curtain element 12 thus forms a screen between two rows of passenger seats 104 which are arranged in the passenger cabin one behind another.

The curtain element 12 has a first edge which faces the movable shell 108 of the overhead luggage bin 102. A first end of the first edge of the curtain element 12 is supported by means of a holder 14. In the arrangement according to FIG. 1, the holder 14 has a frame-like structure with a first frame element 16, a second frame element 18 extending substantially parallel to the first frame element 16 and a third frame element 20 connecting the first and the second frame element 16, 18. The first frame element 16 is connected to a PSU panel by means of a connection mechanism 22 in such a manner that the first frame element 16 extends across the PSU panel 110 substantially perpendicular to the longitudinal axis of the overhead luggage bin 102 and hence also substantially perpendicular to the longitudinal axis of the passenger cabin. The connection mechanism 22 comprises a rail which is adapted to interact with a complementary rail provided in the region of a surface of the PSU panel 110 (not shown in the drawings). Further the connection mechanism 22 comprises a latching device (also not shown in the drawings) for latching the holder 14 in place when the holder 14 is arranged in a desired position relative to the PSU panel 110.

The second frame element 18 extends, parallel to the first frame element 16, also substantially perpendicular to the longitudinal axis of the overhead luggage bin 102 and hence substantially perpendicular to the longitudinal axis of the passenger cabin in the region of the headrests of the passenger seats 104. A second edge of the curtain element 12 which faces away from the overhead luggage bin 102 is attached to the second frame element 18 of the holder 14 so as to provide for a tight separation of the two zones of the passenger cabin. The third frame element 20 extends substantially parallel to a side wall lining panel 112 and is provided with a curved contour which is adapted to the contour of the side wall lining panel 112. A third edge of the curtain element 12 which faces the third frame element 20 is fixed to the third frame element 20.

Figure 2:
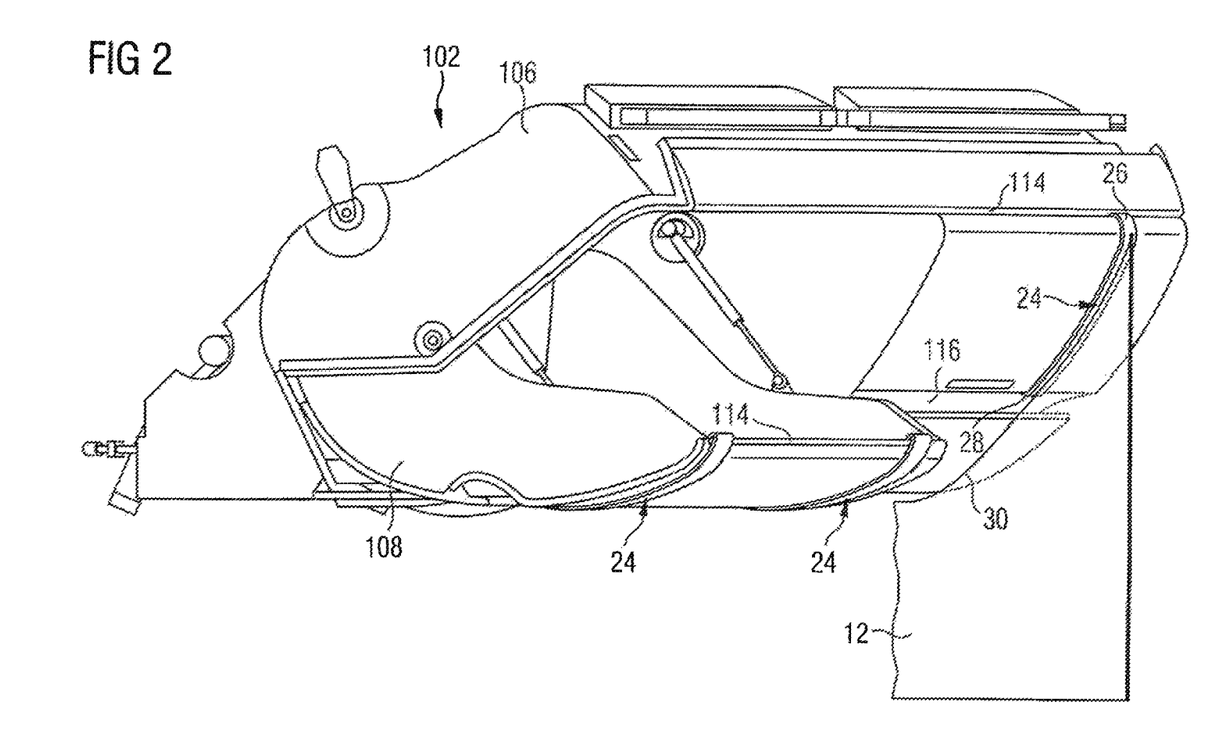
FIG. 2 shows a three-dimensional view of an overhead luggage bin and a part of the separating device of the passenger cabin interior component layout according to FIG. 1.

The separating device 10 further comprises a fixing device 24 for fixing a second end of the first edge of the curtain element which faces the overhead luggage bin 102 to the movable shell 108 of the overhead luggage bin 102. As becomes apparent from FIG. 2, the fixing device 24 comprises a first fixing element 26 which engages with a rim 114 of the movable shell 108 of the overhead luggage bin 102. In particular, the first fixing element 26 comprises a hook which is hooked over the rim 114 of the movable shell 108 so as to attach the second end of the first edge of the curtain element 12 to the movable shell 108. As indicated in FIG. 2, the first fixing element 26 can be brought into engagement with a rim 114 of a movable shell 108 of an overhead luggage bin 102 at a desired position along the longitudinal axis of the passenger cabin.

Further, in the arrangement according to FIG. 1, the fixing device 24 comprises a second fixing element 28 which engages with a grip rail 116 provided on the movable shell 108 of the overhead luggage bin 102. The second fixing element 28 provides for a connection between the first edge of the curtain element 12 and the movable shell 108 of the overhead luggage bin 102 which is releasable, but still "fixed" enough, that disengagement of the fixing device 26 from the movable shell 108 is reliably prevented. For example, the second fixing element 28 may comprise a clamp (not shown in the drawings) which is clamped to the grip rail 116 provided on the movable shell 108 of the overhead luggage bin 102. This allows the first fixing element 28 to be simply hooked over the rim 114 of the movable shell 108.

In the region of its first edge facing the overhead luggage bin 102, the curtain element 12 of the separating device 10 is provided with an elastic strap 30. When the movable shell 108 of the overhead luggage bin 102 is in its open loading position, see the arrangement depicted on the left hand side of FIG. 1, the elastic strap 30 and thus the curtain element 12 is suspended between the holder 14 and the fixing device 24 in a loose manner such that a gap is formed between the movable shell 108 of the overhead luggage bin 102 and the curtain element 12. However, the elastic strap 30 is tensioned when the movable shell 108 of the overhead luggage bin 102 is moved into its closed position and, when the movable shell 108 has reached its closed position, closely follows the contour of the movable shell 108, see the arrangement on the right hand side of FIG. 1. The separating device 10 thus, at least when the aircraft is in flight and the movable shell 108 is in its closed position, tightly separates the passenger cabin into two zones.

In a single aisle aircraft, wherein rows of passenger seats 104 are separated from each other by a main aisle 118 as shown in FIG. 1, two separating devices 10 may be provided. Additionally, a screen 120 in the form of a curtain or the like may be arranged in the region of the main aisle 118 for completing the tight separation between the two zones of the passenger cabin.

As discussed above, in the arrangement according to FIGS. 1 and 2, the second fixing element 28 which interacts with the grip rail 116 provided on the movable shell 108 provides for a secure fixation of the first edge of the curtain element 12 to the movable shell 108 of the overhead luggage bin 102. It is therefore sufficient for the first fixing element 26 to be simply hooked over the rim 114 of the movable shell 108 when the movable shell 108 is in its open loading position. Alternatively, the second fixing element 28 of the fixing device 24 can be omitted, if the first fixing element 26 is provided with a clamp which allows a secure fixation of the first fixing element 26 to the movable shell 108 of the overhead luggage bin 102. A further alternative design of the fixing device 24 is shown in FIG. 3.

Figure 3:
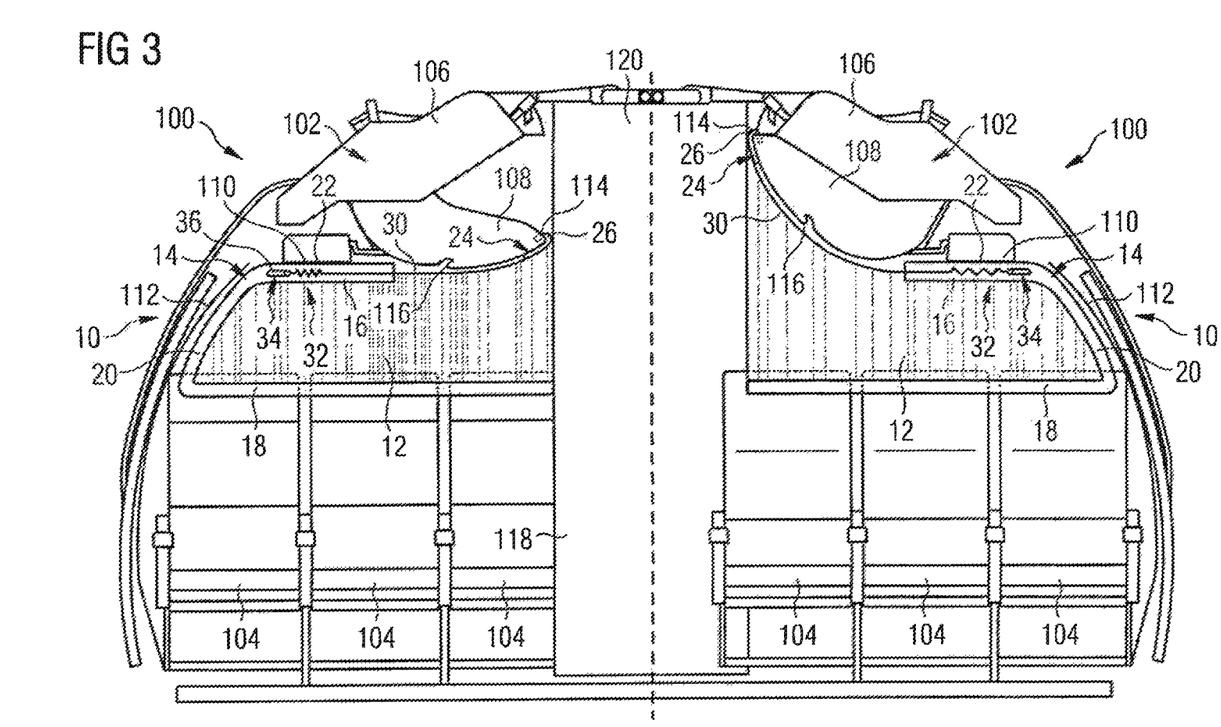
FIG. 3 shows a further embodiment of a passenger cabin interior component layout comprising a separating device for separating two zones of the passenger cabin.

In the embodiment of a passenger cabin interior component layout 100 depicted in FIG. 3, the fixing device 24 for fixing the second end of the first edge of the curtain element 12 to the movable shell 108 of the overhead luggage bin 102 comprises only a first fixing element 26. The first fixing element 26, like the first fixing element 26 according to FIGS. 1 and 2, comprises a hook which engages with the rim 114 of the movable shell 108. However, in order to provide for a secure fixation of the first fixing element 26 and thus the second end of the first edge of the curtain element 12 to the movable shell 108, the holder 14 comprises a tensioning device 32 which is adapted to apply a tension force to the elastic strap 30 provided in the region of the first edge of the curtain element 12. By continuously applying a tension force to the elastic strap 30, the first fixing element 26 can be reliably fixed to the movable shell 108 of the overhead luggage bin 102 without it being necessary that the first fixing element 26 is provided with a clamp or the like.

The tensioning device 32 is designed in the form of a spring. The holder 14 further comprises an activation mechanism 34 which is adapted to activate the tensioning device 32 and comprises a lever arm 36 which is movable between a rest position and an activation position. In FIG. 3, the lever arm 36 is shown in its activation position wherein it activates the tensioning device 32 which then in turn applies a tension force to the elastic strap 30. Further, in the arrangement according to FIG. 3, the activation mechanism 34 fulfils the double function to not only activate the tensioning device 32, but also to activate the connection mechanism 22 for connecting the holder 14 to the PSU panel 110, in particular the latching of the connection mechanism 22 for latching the holder 14 in place when the holder 14 is arranged in a desired position relative to the PSU panel 110. Thus, by moving the lever arm 36 of the activation mechanism 34, the holder 14 can be fixedly attached to the PSU panel 110 and, at the same time, the tensioning device 32 can be activated so as to apply a tension force to the elastic strap 30. The separating device 10 thus is particularly easy to install.

Otherwise, the structure and the function of the separating device depicted in FIG. 3 correspond to the structure and the function of the separating device depicted in FIGS. 1 and 2

Figure 4:
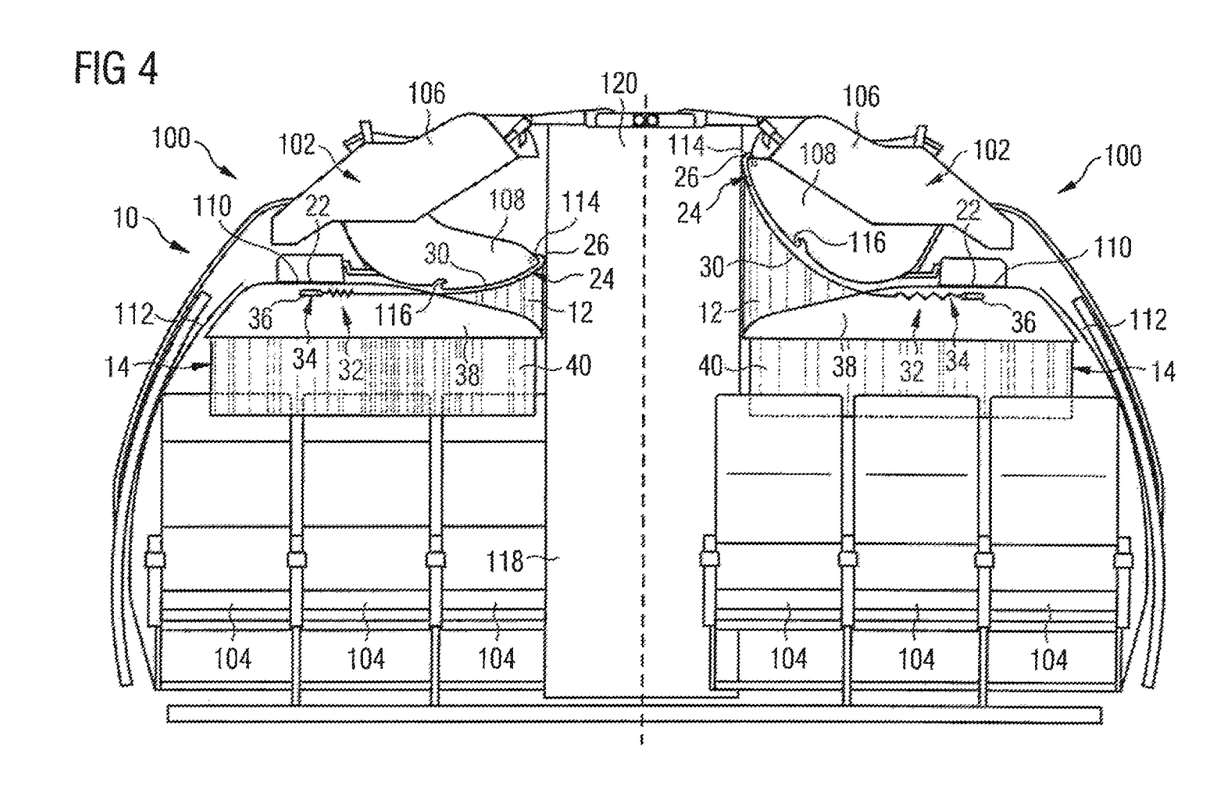
FIG. 4 shows still a further embodiment of a passenger cabin interior component layout comprising a separating device for separating two zones of the passenger cabin.

The passenger cabin interior component layout 100 according to FIG. 4 differs from the arrangement according to FIG. 3 in that the holder 14 of the separating device 10 comprises a panel element 38 which is attached to the PSU panel 110 by means of the connection mechanism 22 in such a manner that the panel element 38 extends in a direction substantially perpendicular to the longitudinal axis of the overhead luggage bin 102 and hence substantially perpendicular to the longitudinal axis of the passenger cabin. A further curtain element 40 is attached to the panel element 38 in a freely suspended manner such that the further curtain element 40 extends from an edge of the panel element 38 which faces away from the overhead luggage bin 102 in the direction of the passenger seats 104. The panel element 38 is shaped and fixed to the PSU panel 110 in such a manner that it does not interfere with the movable shell 108 of the overhead luggage bin 102 in its open loading position, see the arrangement depicted on the left hand side of FIG. 4.

In the arrangement according to FIG. 4, the curtain element 12 of the separating device 10 is dimensioned and shaped in such a manner that it covers an area extending between the movable shell 108 of the overhead luggage bin 102 in its closed position and an edge of the panel element 38 which faces the overhead luggage bin 102. Thus, in the arrangement according to FIG. 4, the curtain element 12 serves to cover a gap existing between the movable shell 108 of the overhead luggage bin 102 and the edge of the panel element 38 which faces the overhead luggage bin 102 when the movable shell 108 is in its closed position.

Otherwise, the structure and the function of the separating device according to FIG. 4 correspond to the structure and the function of the arrangement depicted in FIG. 3.

While specific features of the invention herein have been described in relation to specific embodiments, these features can also be present in other embodiments. For example, the fixing device 24 of the separating device according to FIG. 4 may be equipped with a second fixing element 28 as described in connection with the separating device 10 shown in FIGS. 1 and 2, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A separating device for separating two zones of a passenger cabin equipped with overhead luggage bins comprising a movable shell, the separating device comprising:
   a curtain element made of a flexible material and being dimensioned and shaped so as to be capable of at least partially covering an area extending below the overhead luggage bin with the moveable shell of the overhead luggage bin being in a closed position in a direction substantially perpendicular to a longitudinal axis of the overhead luggage bin, the curtain element having a first edge configured to face the movable shell of the overhead luggage bin when the separating device is mounted in the passenger cabin,
   a holder supporting a first end of the first edge of the curtain element,
   a fixing device configured to fix a second end of the first edge of the curtain element to the movable shell of the overhead luggage bin, and
   an elastic strap, in a region of the first edge of the curtain element facing the movable shell of the overhead luggage bin, extending between the holder and the fixing device, wherein when the movable shell is moved from an open loading position into a closed position, a tension on the elastic strap is increased.

2. The separating device according to claim 1, wherein the fixing device comprises a first fixing element configured to engage with a rim of the movable shell of the overhead luggage bin.

3. The separating device according to claim 2, wherein the fixing device comprises a second fixing element configured to engage with a grip rail provided on the movable shell of the overhead luggage bin.

4. The separating device according to claim 1, wherein the holder comprises a connection mechanism configured to connect the holder to a PSU panel so as to extend in a direction substantially perpendicular to the longitudinal axis of the overhead luggage bin when the separating device is mounted in the passenger cabin.

5. The separating device according to claim 4, wherein the holder comprises an activation mechanism configured to activate the tensioning device so as to apply a tension force to the elastic strap.

6. The separating device according to claim 4, wherein the holder comprises an activation mechanism configured to activate the tensioning device to activate the connection mechanism for connecting the holder to the PSU panel, the activation mechanism comprising a lever arm movable between a rest position and an activation position.

7. The separating device according to claim 1, wherein the holder comprises a tensioning device configured to apply a tension force to the elastic strap.

8. The separating device according to claim 1, wherein the holder has a frame-like structure with a first frame element, a second frame element extending substantially parallel to the first frame element and a third frame element connecting the first and the second frame element, the first frame element being configured to be connected to the PSU panel via the connection mechanism to extend in a direction substantially perpendicular to the longitudinal axis of the overhead luggage bin when the separating device is mounted in the passenger cabin.

9. The separating device according to claim 1, wherein the holder comprises a panel element and a further curtain element attached to the panel element in a freely suspended manner, the panel element being configured to be connected to the PSU panel via the connection mechanism to extend in a direction substantially perpendicular to the longitudinal axis of the overhead luggage bin when the separating device is mounted in the passenger cabin.

10. A method of separating two zones of a passenger cabin equipped with overhead luggage bins comprising a movable shell, said method comprising the following steps:
providing a separating device according to claim 1,
mounting the holder of the separating device at a desired location in the passenger cabin,
fixing the second end of the first edge of the curtain element to the movable shell of the overhead luggage bin.

11. A passenger cabin interior component layout comprising:
an overhead luggage bin comprising a movable shell, and
a separating device configured to separate two zones of the passenger cabin, the separating device comprising:
a curtain element made of a flexible material and being dimensioned and shaped to at least partially cover an area extending below the overhead luggage bin with the moveable shell of the overhead luggage bin being in a closed position in a direction substantially perpendicular to a longitudinal axis of the overhead luggage bin, the curtain element having a first edge facing the movable shell of the overhead luggage bin,
a holder supporting a first end of the first edge of the curtain element,
a fixing device fixing a second end of the first edge of the curtain element to the movable shell of the overhead luggage bin, and
an elastic strap, in a region of the first edge of the curtain element facing the movable shell of the overhead luggage bin, extending between the holder and the fixing device, wherein when the movable shell is moved from an open loading position into a closed position a tension on the elastic strap increases.

12. The passenger cabin interior component layout according to claim 11, wherein the fixing device comprises at least one of a first fixing element which engages with a rim of the movable shell of the overhead luggage bin and a second fixing element which engages with a grip rail provided on the movable shell of the overhead luggage bin.

13. The passenger cabin interior component layout according to claim 11, wherein the holder comprises a connection mechanism for connecting the holder to a PSU panel to extend in a direction substantially perpendicular to the longitudinal axis of the overhead luggage bin.

14. The passenger cabin interior component layout according to claim 13, wherein the holder further comprises an activation mechanism configured to activate the connection mechanism for connecting the holder to the PSU panel, the activation mechanism comprising a lever arm movable between a rest position and an activation position.

15. The passenger cabin interior component layout according to claim 11, wherein the holder comprises a tensioning device configured to apply a tension force to the elastic strap, and wherein the holder further comprises an activation mechanism configured to activate the tensioning device to apply a tension force to the elastic strap.

16. The passenger cabin interior component layout according to claim 11, wherein the holder has a frame-like structure with a first frame element, a second frame element extending substantially parallel to the first frame element and a third frame element connecting the first and the second frame element, the first frame element being connected to the PSU panel via the connection mechanism to extend in a direction substantially perpendicular to the longitudinal axis of the overhead luggage bin.

17. The passenger cabin interior component layout according to claim 11, wherein the holder comprises a panel element and a further curtain element attached to the panel element in a freely suspended manner, the panel element being connected to the PSU panel via the connection mechanism to extend in a direction substantially perpendicular to the longitudinal axis of the overhead luggage bin.

* * * * *